UNITED STATES PATENT OFFICE.

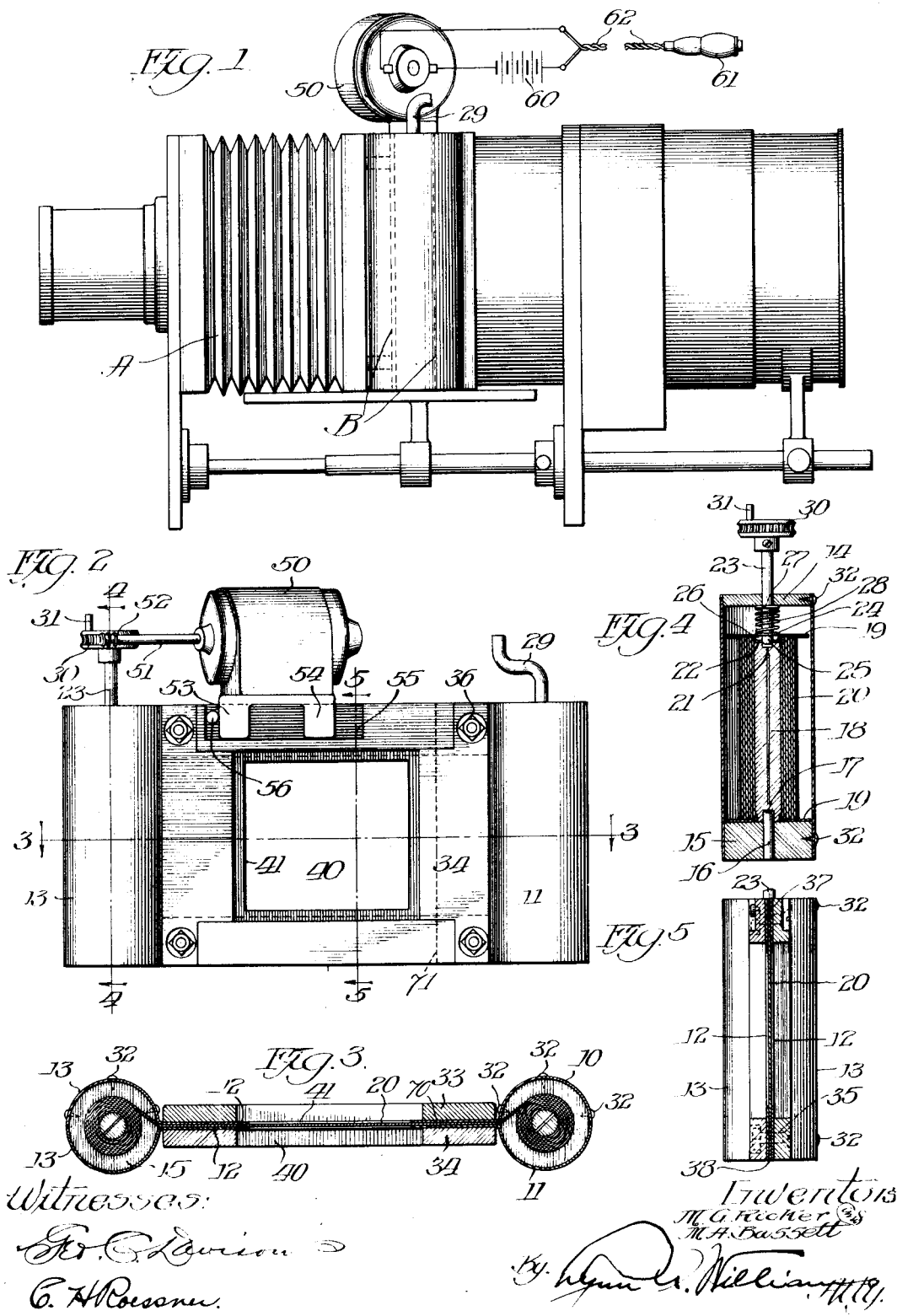

MAURICE G. RICKER, OF DES MOINES, IOWA, AND MORTON A. BASSETT, OF CHICAGO, ILLINOIS.

OPTICAL PROJECTION APPARATUS.

1,176,691. Specification of Letters Patent. Patented Mar. 21, 1916.

Application filed January 8, 1915. Serial No. 1,138.

*To all whom it may concern:*

Be it known that we, MAURICE G. RICKER and MORTON A. BASSETT, citizens of the United States, residing, respectively, at Des Moines, in the county of Polk and State of Iowa, and Chicago, in the county of Cook and State of Illinois, have invented certain new and useful Improvements in Optical Projection Apparatus, of which the following is a full, clear, concise, and exact description, reference being had to the accompanying drawings, forming a part of this specification.

Our invention relates to improvements in optical projection apparatus and has more particularly to do with the transparent views through which the light of a stereopticon lantern is projected upon a screen.

In accordance with our invention we provide a frame in which a pair of spools are mounted and upon which spools is wound a flexible film-like roll of stereopticon views. The spools are provided with means for effecting their rotation upon their axes, whereby the film may be passed through an aperture in the frame to bring successive views into the optical axis of the stereopticon, the film being wound upon one of the spools while it is unwound from the other. Our invention provides not only manual means for moving the film through the frame while unwinding from one spool and winding upon the other, but it provides also for an electric motor readily attached to or detached from the film frame and adapted to be connected with a source of current by means of a push button or other switch which may desirably be connected at the end of long flexible conductors, whereby the lecturer may stand immediately in front of the screen and himself control the advancement of the film to bring successive views into position to be projected upon the screen.

The objects of our invention are mainly to provide a simple and inexpensive apparatus of this class, one in which the film of views may be easily replaced, one in which the danger of combustion or explosion from the heat of the stereopticon lantern is reduced to a minimum, and one in which the distant electrical control of the film feeding apparatus is effective in operation, interchangeable, and inexpensive to produce, attach and maintain.

These and the several other features and objects of our invention will more fully appear from reference to the accompanying drawings, in which—

Figure 1 illustrates a stereopticon equipped with the apparatus of our invention; Fig. 2 is a front elevation of the film-holding and feeding apparatus of our invention; Fig. 3 is a cross-sectional view of the same taken on line 3, 3 of Fig. 2; Fig. 4 is a cross-sectional view of one of the spools and spool-holders taken on line 4, 4 of Fig. 2; and Fig. 5 is a cross-sectional view taken on line 5, 5 of Fig. 2.

The same reference characters are applied to the same parts in all of the several figures.

In Fig. 1 we have indicated the outline of a stereopticon A provided with a slide stage indicated in dotted lines at B, this stage being preferably of a type in which the ordinary slide-holder may be inserted from the top. It will be understood that this stereopticon comprises the usual projecting lens, the condensing lenses, the lamp serving as a source of light, and the various adjustments commonly provided in stereopticons of this general type.

In Figs. 2 and 3 we have shown two casing or frame sections 10 and 11 which may conveniently be formed of sheet aluminum. The two halves of the casing or frame are substantially alike, each half being provided with a plane middle stretch or section 12, and with a semi-cylindrical end section 13. When the two halves are brought into register, as shown in Fig. 3, there is formed at either end a hollow cylindrical casing, in each of which casings a film spool is mounted.

The details of the spool casings are best illustrated in Fig. 4, which illustrates at the top of each casing a fiber top cover 14 and a fiber or wooden bottom plate 15. A metal stud 16 mounted in the bottom plate serves as a pivot over which a recess 17 in the bottom of the spool 18 is fitted, as indicated in the drawing. The spool comprises not only the cylindrical wooden body, but preferably a pair of metal flanges 19, 19 to guide the photographic film 20.

The upper end of the spool is provided not only with a cylindrical central aperture 21, but also with a crosswise slit 22 in the manner commonly employed in photographic films for "kodaks" and other hand cameras. Projecting through the top cover plate 14 is a driving spindle 23 provided with a fixed collar at 24, a circular pivot at 25 and screw-driver wings or flanges at 26. A metal washer surrounds the driving spindle at 27, and a helical compression spring 28 is located between the collar 24 and the washer 27, this spring tending to force the driving spindle downward and to hold it in engagement with the film spool. The driving spindle 23 is provided at its upper end with a knurled head or with a small crank arm 29, as indicated in Fig. 2. In Fig. 4 we have illustrated the knurled head in the form of a small worm wheel 30, which may be provided, if desired, with a crank pin in its upper surface. The worm wheel may be used either as a knurled thumb head or in connection with the motor drive subsequently to be described.

It will be understood that the film casings at both ends of the frame will be provided with devices like those shown in Fig. 4, except that ordinarily the worm wheel 30 will not be provided on both driving spindles.

One half of the sheet metal frame, as, for example, the part marked 10 in Fig. 3, will be permanently attached to the fiber top and bottom plates 14 and 15 by means of the small screws 32, 32. The other half of the frame, as indicated at 11 in Fig. 3, will not ordinarily be attached to these top and bottom plates, thereby facilitating the separation of the two halves of the frame and casings to remove and replace the films and film spools.

The plane central or middle portions of the frame and casing members are provided on either side with wooden frames 33 and 34, the wooden frame members being fastened together with screws 35 and countersunk nuts 36, most clearly illustrated in Figs. 2 and 5. When these screws are drawn up they serve to clamp the two metallic frame or casing pieces 10 and 11 between the wooden frames.

As best indicated in cross-section in Fig. 5 and in dotted lines in Fig. 2, thin strips of sheet metal 37 and 38 are clamped between the frame or casing pieces 10 and 11 at top and bottom in order that the frame or casing pieces may be spaced a slight distance apart to provide a slit for the passage of the film 20 and to guide and maintain the alinement of the film at top and bottom. The wooden frames 33 and 34 are provided with a large aperture at 40 and the frame or casing pieces 10 and 11 with a smaller aperture at 41, so that a strip of the film having the length and width of a lantern slide may be exposed in the central part of the frame, whereby light rays emanating from the lamp and passing through the condenser may be projected through the projecting lens upon the distant screen. The film is provided with a series of views in any of the methods known to the photographic arts, each view upon the film having approximately the size of the aperture 41 and the several views being spaced but a short distance apart upon the film. With this arrangement it is a simple matter to provide a single film containing positives of fifty or more views, any of which may be projected upon the screen by bringing the required view to its position within the aperture 41. It will be understood, of course, that the views may be shifted by turning manually the cranks 29 or 31 or the knurled thumb heads with which the driving spindles of the spool-holders are provided. Our invention goes further, however, and in accordance therewith we provide a very small electric motor indicated at 50 and provided upon the end of the armature shaft 51 with a small worm 52 adapted to mesh with the worm wheel 30. The base of the motor is provided with a pair of spring clips 53 and 54. These spring clips engage the sides of the wooden frames 33 and 34, as best illustrated in Fig. 2, the frame pieces being notched out on either side as indicated at 55 so that the springs will not project beyond the plane of the outer surfaces of the wooden frame. A pin 56 is so located as to position the motor and the worm 52 when the spring clip 53 is brought into engagement with the pin, as shown in Fig. 2.

The arrangement is such that the motor with its spring clips can be slipped to the right, in Fig. 2, to disengage the worm 52 from the worm wheel 30, thereby permitting the film spools to be rotated manually. The spring clips 53 and 54 allow the motor to be rotated slightly to one side as it is slipped forward, in order to bring the threads of the worm into engagement with the teeth of the worm wheel. The motor is adapted to be connected with a source of current such, for example, as a battery indicated at 60. The motor circuit is closed by a pear-shaped push button 61 at the end of a long flexible cord 62.

The operation of our invention will be apparent from the above description. It may be said, however, that at the commencement of a lecture the film will be wound entirely upon the spool located in the casing at the right-hand end of Fig. 2. The left-hand end of the film passes through a slit in the spool in the left-hand casing in order to provide a more or less permanent attachment of the end of the film with the spool. If the motor is not to be employed, the stereopticon operator will turn the crank 31 to bring the first view within the aperture 41, when the image will be projected upon the screen. When the next view is to be thrown upon the screen the crank 31 will be turned to wind up the film on the spool at the left until the next succeeding view is brought into register with the aperture 41. All of the views can successively be brought to the optical axis of the stereopticon with but little trouble and no delay. The film is guided accurately through the frame and is held flat and true within the aperture 41.

In case it is desired to employ the motor for advancing the film, it is necessary merely to slip the motor into position upon the top of the film frame, as shown in Figs. 1 and 2, and the motor having been connected with dry cells or other suitable source of current, the motor is operated to advance the film whenever the push button 61 is pressed. In case the motor is employed, therefore, the lecturer, who stands near the screen, may press the button to advance the film and thus to bring the various views successively into the optical axis of the stereopticon to be thrown upon the screen.

The two halves of the casing may be separated as previously pointed out, in order to accommodate the insertion of film and film spools. Ordinarily this provision will be availed of only at the factory, because the frames and casings are very inexpensive. The manufacturer will ordinarily supply a lecturer with the complete frame and casing with a complete film of views already mounted in place. When the lecturer requires an additional set of views, he will ordinarily buy a film together with its spools and the casing and frame within which they are mounted, as shown in the drawings. It will be apparent that these frames or casings contain a pair of spools, and the desired film can be sold as a unit, and that when purchased a set of views occupies but little room. It will have but little weight and can be easily packed and transported and without danger of breakage.

A further important feature of our invention resides in the provision of a narrow metallic slit surrounding the aperture 41 and through which the film is passed. This is of importance because photographic films are ordinarily of highly inflammable material such as celluloid. When a section of film is at rest within the aperture 41, it is subjected to a considerable degree of heat and may be considered as liable to ignition. We have repeatedly demonstrated, however, that even of a section of the film within the aperture 41 be ignited by a match, the film will burn up to the edges of the aperture and not beyond. This is due to the fact that the metallic plates which form both sides of the slit through which the film passes are good conductors of heat. The result is, therefore, that the heat generated by the combustion of the section of film within the aperture is carried away by the metallic plates, and since the slit through which the film passes is very narrow, the flame will not be propagated beyond the boundaries of the aperture 41. The burning of the section of film within the aperture 41 would not be dangerous in the slightest degree. If, however, the flame were propagated to the chambers or casings within which the spools are located, there would be some danger of an explosion. Since our invention provides means preventing entirely the propagation of any flame to these spool chambers, there can be no danger of explosion in the use of the device.

In case it is desired to employ the unitary film holder and conveyer of our invention in connection with a stereopticon provided with a slide stage open only at the sides and not at the top, it will be found convenient in many instances to cut the metal parts of the frame and slide at a point corresponding in position with the head of the arrow 70 and as indicated in the dotted line 71 in Fig. 2. With this provision the frame can be inserted from one side of the slide stage, after which the right-hand end, as illustrated in Fig. 2, of the film may be threaded upon the spool in the chamber 11. Thereafter the chamber 11 with its metal extensions may be inserted within the slit left open at the end of the wooden frame, whereupon the screws and nuts at the right-hand end of the frame may be inserted and tightened to hold the device together. The purpose of this division upon the line 71 is to permit the relatively thin wooden frame comprising the pieces 33 and 34 with the metal parts clamped between them to be inserted through the aperture of a slide stage which is not wide enough to receive the chamber 11. In this manner the film holder and conveyer may be adapted for insertion into the slide stage of practically any stereopticon in commercial use.

Having described our invention, we claim as new and desire to secure by Letters Patent:

1. In a device of the class described, the combination of a pair of substantially closed film chambers, a film spool rotatably mounted in each film chamber, an all metal film slide having a film slit extending substantially from one film chamber to the other, one of the film chambers being removably attached to the film slide, the said film slide being provided with a metal-edged aperture adapted to be placed in the optical axis of a stereopticon, and means for rotating the film spools within the film chambers.

2. In a device of the class described, the combination of two substantially closed cylindrical film chambers, a film spool rotatably mounted within each film chamber, externally operable means extending into each film chamber and connected with the film spool therein to cause the rotation thereof, a metallic film slide extending from film chamber to film chamber and provided with an aperture for the passage of light rays through a section of film falling within the aperture, one of the film chambers being removably attached to the film slide, the film slide being arranged closely to embrace the exposed section of the film upon all sides of the said aperture.

3. In a device of the class described, the combination of a frame and casing comprising two halves including a pair of semicylindrical film chamber portions, and a substantially plane film slide member connecting the pair of film chamber portions, a film spool rotatably mounted in each of the film chambers, means for rotating the said spools to wind and unwind film from the said spools and to convey it through the film slide, and means for holding the two halves of the said frame and casing member in register with one another to form substantially inclosed film chambers and a film slide adapted substantially to surround the section of film extending between the two film chambers.

4. In combination, a stereopticon having a slide stage open at the top for the reception of a lantern slide frame, a frame comprising a film slide adapted to be inserted in said stage, a flexible film containing a plurality of projection views, and means for advancing the film intermittently through the film slide provided by said frame.

5. In a device of the class described, the combination of a frame adapted to be mounted upon the slide stage of an optical projector, a film spool rotatably mounted at or near either end of the said frame, an electric motor detachably mountable upon the said frame, and mechanism connecting the moving part of the said motor with one of said film spools, whereby the operation of the motor will cause rotation of the said film spool, as and for the purpose described.

6. In a device of the class described, the combination of a pair of substantially closed film chambers, a film spool rotatably mounted in each chamber, a film slide having a film slit extending substantially from one film chamber to the other, one of the film chambers being removably attached to the film slide, the said film slide being provided with an aperture adapted to be placed in the optical axis of a stereopticon, and means for rotating the film spools within the film chambers.

In witness whereof, we hereunto subscribe our names, in the presence of two witnesses, this 24 day of December, A. D. 1914.

MAURICE G. RICKER.
M. A. BASSETT.

Witnesses:
A. B. GUTKNECHT,
B. ERICKSEN.